United States Patent [19]
Burdenski et al.

[11] Patent Number: 5,991,607
[45] Date of Patent: Nov. 23, 1999

[54] TELECOMMUNICATION DEVICE WITH SWITCHING ARRANGEMENT CONSTRUCTED AS A RING CIRCUIT

[75] Inventors: Ralf Burdenski, Nürnberg, Germany; Christopher Marshall, Heywards Heath, United Kingdom

[73] Assignee: U.S. Philips Corporation, New York, N.Y.

[21] Appl. No.: 08/918,968
[22] Filed: Aug. 27, 1997
[30] Foreign Application Priority Data Aug. 29, 1996 [DE] Germany ............... 196 35 175

[51] Int. Cl.⁶ .................................. H04B 1/44
[52] U.S. Cl. .................. 455/83; 455/78; 455/82; 333/103
[58] Field of Search .................. 455/567, 560, 455/562, 561, 82, 78, 83, 84, 272, 277.1; 379/372, 373, 375, 380, 382, 386; 333/101, 103, 104, 262

[56] References Cited

U.S. PATENT DOCUMENTS

| | | | |
|---|---|---|---|
| 5,584,053 | 12/1996 | Kommrusch et al. | 455/82 |
| 5,625,894 | 4/1997 | Jou | 455/78 |
| 5,642,083 | 6/1997 | Kato et al. | 333/103 |
| 5,812,939 | 9/1998 | Kohama | 455/78 |

FOREIGN PATENT DOCUMENTS

4430987C1  11/1995  Germany.

Primary Examiner—Dwayne D. Bost
Assistant Examiner—Erika A. Gary
Attorney, Agent, or Firm—Dicran Halajian

[57] ABSTRACT

A switching device is disclosed having a ring circuit with four nodes and four switching elements which selectively interconnect the four nodes. A first compensation branch inter-connects a first pair of mutually opposing nodes, and a second compensation branch inter-connects a second pair of mutually opposing nodes. The first compensation branch generates a first parallel resonance in conjunction with a first non-conducting one of the four switching elements, and the second compensation branch generates a second parallel resonance in conjunction with a second non-conducting one of the four switching elements. The first parallel resonance is connected in parallel to a conducting one of the four switching elements, and the second parallel resonance is connected in parallel to the conducting one of the four switching elements. Each compensation branch includes an inductor which forms the respective parallel resonances in conjunction with a capacitance of a non-conducting switching element.

17 Claims, 1 Drawing Sheet

TELECOMMUNICATION DEVICE WITH SWITCHING ARRANGEMENT CONSTRUCTED AS A RING CIRCUIT

BACKGROUND OF THE INVENTION

The invention relates to a telecommunication device, in particular a radio device, with a switching arrangement constructed as a ring circuit and comprising four switching paths each with a switching element, which switching arrangement serves to couple two first signal paths to two second signal paths, as required, while its switching elements are connected in parallel to compensation branches which each serve to generate a parallel resonance in conjunction with a non-conducting switching element.

A radio device is known from DE 44 30 987 C1 which comprises a switching arrangement arranged as a ring circuit with four switching paths. The switching paths each comprise a switching element and serve to couple the transmitter or the receiver of the radio device to one of two transmission or reception antennas. If, for example, the transmitter of the radio device is coupled to one of the two antennas for radiating a signal, the coupling of the signal generated by the transmitter via the switching arrangement to the receiver is to be suppressed, i.e. a switching element of the switching arrangement, when in the non-conducting state, must not allow in particular high-frequency signals to pass, or no more than insubstantial portions thereof.

It is furthermore known to connect a compensation branch in parallel to each switching element, which branch generates a parallel resonance together with the parallel switching element in the non-conducting state thereof, provided the switching elements are constructed as semiconductor switches. This enhances the blocking action of a semiconductor switch in the open (non-conducting) state. The blocking action of an open semiconductor switch is adversely affected by the fact that, in the non-conducting state, a capacitance is active with respect to the exterior which is essentially determined by housing influences, leading to a reduced damping, or a partial passage of high-frequency signals. This is relevant to all radio applications, for example in GSM devices ("Global System for Mobile communications") or DECT devices ("Digital European Cordless Telecommunication"). The compensation branches connected in parallel serve to compensate for this effect.

OBJECTS AND SUMMARY OF THE INVENTION

The invention has for its object to modify the telecommunication device of the kind mentioned in the opening paragraph such that the number of components necessary for realizing the switching arrangement of the telecommunication device is reduced.

This object is achieved in that the assignment of a compensation branch to one of the switching elements is dependent on the switching state of the switching arrangement.

As a result, it is not necessary to provide a compensation branch for each switching element. The number of compensation branches required, and thus the number of components necessary for realizing the compensation means assigned to the switching arrangement, is reduced.

In particular, two compensation branches are provided, one of which interconnects two mutually opposed connection points of the switching arrangement and the other one of which interconnects the two other connection points, while only one of the switching elements formed by semiconductor switches is in the conducting state in the various switching states of the switching arrangement, and inductances are arranged in the compensation branches which serve to generate parallel resonances in conjunction with the outwardly active capacitance of the non-conducting switching elements which adjoin the switching element which is in the conducting state. A simple and inexpensive embodiment is achieved in this manner. The construction of the switching elements as semiconductor switching elements means that the latter can be readily controlled by means of a digital circuit. In particular, the semiconductor switching elements are constructed as switching diodes which can be brought into their conducting or non-conducting states through the application of suitable DC voltages.

The invention also relates to a switching arrangement with four switching branches arranged in a ring circuit, each with a switching element, while compensation branches are connected in parallel to the switching elements, which branches each serve to generate a parallel resonance in conjunction with a non-conducting switching element, the assignment of a compensation branch to one of the switching elements being dependent on the switching state of the switching arrangement. The switching arrangement is universally applicable in all devices in which four signal paths are to be switched for alternating current or high-frequency signals and leads to a reduction in the number of components necessary for realizing compensation means for the switching elements used, as was noted above. In particular, a transmitter and a receiver are coupled to two antennas, as required, which procedure is used, for example, in mobile radio terminals in motor vehicles. Switching from the transmission/reception antenna of the mobile radio terminal to a transmission/reception antenna of the motor vehicle is advantageous in this application. The invention also relates to a method of operating such a switching arrangement.

BRIEF DESCRIPTION OF THE DRAWING

Embodiments of the invention will be explained in more detail below with reference to the drawings, in which.

DETAILED DESCRIPTION OF THE PREFERRED EMBODIMENT

Figure 1:
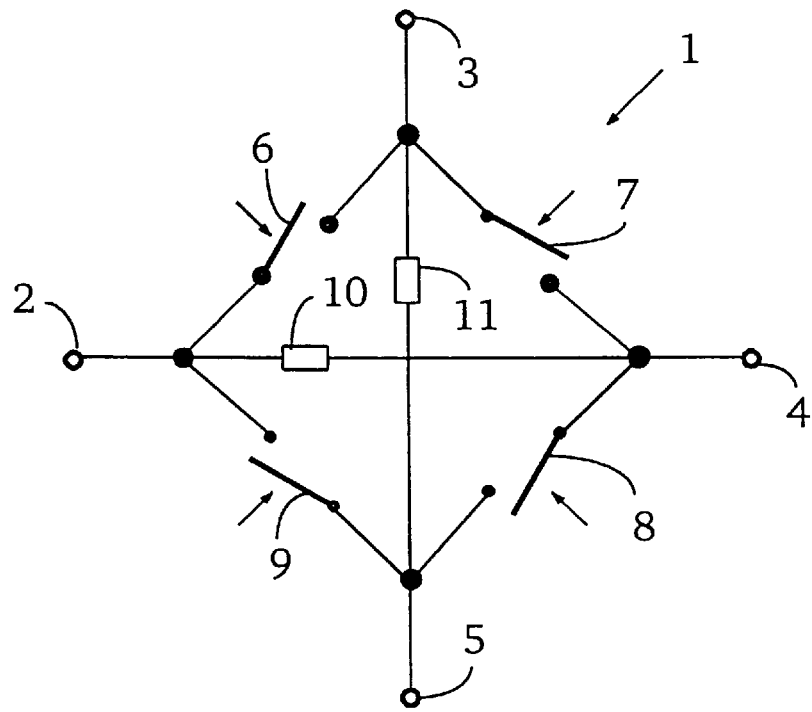
FIG. 1 shows a switching arrangement constructed as a ring circuit.

The switching arrangement 1 shown in FIG. 1 and constructed as a ring circuit has connection points 2, 3, 4 and 5 which are provided for the purpose of coupling to various signal paths. Controllable switching elements 6, 7, 8 and 9, whose control possibilities are indicated with arrows, are present between the connection points 2 to 5. The switching element 6 lies between the connection points 2 and 3, the switching element 7 between the connection points 3 and 4, the switching element 8 between the connection points 4 and 5, and the switching element 9 between the connection points 5 and 2. Two mutually opposed connection points can each be coupled to another one of the two other connection points through a suitable control of the switching elements 6 to 9. Thus the connection point 3 can be coupled to the connection points 2 and 4, and the connection point 5 can be similarly coupled to the connection points 2 and 4. In the switching arrangement 1 as shown, only those switching states are provided in which one of the four switching elements is in the conducting state while the other three switching elements are in the non-conducting state. If, for example, the switching element 6 is switched to its conducting state, the other switching elements 7 to 9 will be switched to their non-conducting state. In this switching state, a signal can be transmitted from connection point 2 to connection point 3 or inversely from connection point 3 to connection point 2.

An impedance 10 is connected between the connection points 2 and 4 and thus lies parallel to the switching elements 6 and 7 and parallel to the switching elements 8 and 9. An impedance 11 is present between the connection points 3 and 5 and thus lies parallel to the switching elements 6 and 9 and parallel to the switching elements 7 and 8. The branches with the impedances 10 and 11 form two compensation branches which serve to compensate for outwardly active capacitances of the switching elements 6 to 9 when the latter are in the non-conducting state. Semiconductor switching elements in the non-conducting state in particular show corresponding parasitic capacitances which are essentially determined by the housing capacitances of such components. This renders the switching elements 6 to 9 partly transmittive to AC and in particular HF signals also in the non-conducting state.

The impedances 10 and 11 are so dimensioned that they each form a parallel resonant circuit for a narrow-band frequency range in conjunction with the non-conducting switching elements adjacent to a switching element which is in the conducting state. This leads to an increased damping by the switching elements which are in the non-conducting (i.e. open) state. If, for example, the switching element 6 is in the conducting state (i.e. the closed state), the impedance 11 with the switching element 9 on the one hand and the impedance 10 with the switching element 7 on the other hand each form a parallel resonant circuit across the switching element 6. The values of the impedances 10 and 11 suitable for generating parallel resonances are to be determined in dependence on the frequency range. In the present example (switching element 6 in the conducting state), accordingly, the impedances 10 and 11 are assigned to the switching element 7 and the switching element 9, respectively, for generating a parallel resonance. The assignment of the compensation branches with the impedances 10 is changed in accordance with the relevant switch settings in those cases in which another one of the four switching elements 6 to 9 is in the conducting state, while the other switching elements are controlled so as to be non-conducting, so that the impedances are connected to the two switching elements adjoining the switching element which is in the conducting state each time for generating parallel resonances.

Figure 2:
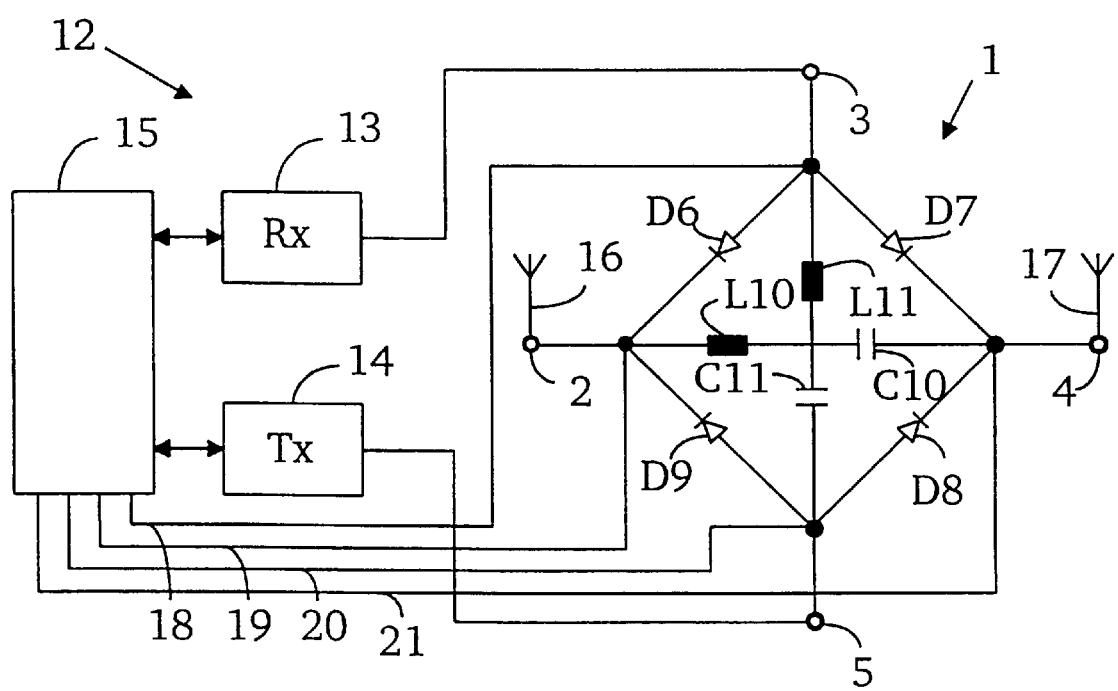
FIG. 2 shows a telecommunication device according to the invention constructed as a radio device.

FIG. 2 shows a radio device 12 comprising an embodiment of the circuit arrangement 1 of FIG. 1. The radio device 12 is, for example, a mobile radio terminal operating by the GSM standard, or a cordless telephone operating by the DECT standard. The invention, however, is not limited to such radio devices. An application in different telecommunication devices in which two transmission or reception signals can each be assigned to one of two possible signal paths is also covered by the invention. The present radio device 12 comprises a receiver 13 and a transmitter 14 which are both coupled to a digital part 15 which is responsible for the conversion of a digital signal processing of signals received through the receiver 13 or radiated through the transmitter 14. Usually microprocessors and/or signal processors are used in the digital part 15. The receiver 13 is further coupled to the connection point 3 of the switching arrangement 1. Similarly, the transmitter 14 is coupled to the connection point 5 of the switching arrangement 1. The connection points 2 and 4 of the switching arrangement 1 are each coupled to an antenna. A transmission and reception antenna 16 is coupled to the connection point 2, a transmission and reception antenna 17 to the connection point 4. Depending on the switching state of the switching arrangement 1, either the receiver 13 is connected to one of the antennas 16, 17, or the transmitter 14 is coupled to one of the two antennas 16, 17. The switching elements 6 to 9 of the switching arrangement 1 are constructed as switching diodes D6, D7, D8, D9 in this embodiment. In an alternative embodiment, for example, the switching elements 6 to 9 could be formed by transistor switching elements. The impedance 10 is formed by a series circuit of an inductance L10 and a capacitor C10. The impedance 11 is formed by a series circuit of an inductance L11 and a capacitor C11. The inductances L10 and L11 serve to generate parallel resonances in conjunction with the two non-conducting switching diodes associated therewith in dependence on the switching state of the switching arrangement 1. The generation of parallel resonances and the object to be achieved thereby have been described with reference to FIG. 1. In the present case, a partial transmission of high-power signals generated by the transmitter 14 to the receiver 13 is particularly suppressed, so that malfunctionings or even the destruction of the receiver 13 is avoided.

The control of the switching diodes D6 to D9 is achieved by means of DC signals transmitted through control lines 18 to 21. The diodes D6 to D9 are switched to their conducting or non-conducting states through suitably chosen DC values. The capacitors C10 and C11 serve for the DC decoupling of the two connection points of the compensation branch with the impedance 10 or of the two connection points of the compensation branch with the impedance 11, as applicable, which is necessary in view of the control of the switching diodes D6 to D9 by means of DC signals.

What is claimed is:

1. A switching device formed as a ring circuit comprising:
    four nodes;
    four switching elements which selectively inter-connect said four nodes;
    a first compensation branch which inter-connects a first pair of mutually opposing nodes of said four nodes; and
    a second compensation branch which inter-connects a second pair of mutually opposing nodes of said four nodes;
    wherein said first compensation branch generates a first parallel resonance in conjunction with a first non-conducting one of said four switching elements, and said second compensation branch generates a second parallel resonance in conjunction with a second non-conducting one of said four switching elements;
    said first parallel resonance being connected in parallel to a conducting one of said four switching elements, and said second parallel resonance being connected in parallel to said conducting one of said four switching elements.

2. The switching device of claim 1, wherein said four switching elements include diodes.

3. The switching device of claim 1, wherein said four switching elements include transistors.

4. The switching device of claim 1, wherein said first compensation branch includes an inductor which forms said first parallel resonance in conjunction with a capacitance of said first non-conducting one of said four switching elements.

5. The switching device of claim 1, wherein a transmitter and a receiver are connected to said first pair of mutually opposing nodes and two antennas are connected to said second pair of mutually opposing nodes.

6. A switching device formed as a ring circuit comprising:

four nodes;

four switching elements which selectively inter-connect said four nodes; and compensation branches which inter-connect mutually opposing nodes of said four nodes;

said compensation branches generating parallel resonances in conjunction with non-conducting ones of said four switching elements, said parallel resonances being connected in parallel to a conducting one of said four switching elements.

7. The switching device of claim 6, wherein said four switching elements include one of diodes and transistors.

8. The switching device of claim 6, wherein said compensation branches include inductors which form said parallel resonances in conjunction with capacitances of said non-conducting one of said four switching elements.

9. The switching device of claim 6, wherein a transmitter and a receiver are connected to a first pair of mutually opposing nodes and two antennas are connected to a second pair of mutually opposing nodes.

10. A switching device formed as a ring circuit comprising:

switching elements which selectively inter-connect nodes of said switching device; and compensation branches which inter-connect mutually opposing nodes of said switching device;

said compensation branches generating parallel resonances in conjunction with non-conducting ones of said switching elements, said parallel resonances being connected in parallel to a conducting one of said switching elements.

11. The switching device of claim 10, wherein said switching elements include one of diodes and transistors.

12. The switching device of claim 10, wherein said compensation branches include inductors which form said parallel resonances in conjunction with capacitances of said non-conducting one of said switching elements.

13. The switching device of claim 10, wherein a transmitter and a receiver are connected to a first pair of mutually opposing nodes and two antennas are connected to a second pair of mutually opposing nodes.

14. A communication device comprising:

a transmitter;

a receiver;

two antennas; and a switching device formed as a ring circuit; said switching device including:

four nodes;

four switching elements which selectively inter-connect said four nodes; and compensation branches which inter-connect mutually opposing nodes of said four nodes;

said compensation branches generating parallel resonances in conjunction with non-conducting ones of said four switching elements, said parallel resonances being connected in parallel to a conducting one of said four switching elements.

15. The communication device of claim 14, wherein said four switching elements include diodes.

16. The communication device of claim 14, wherein said four switching elements include transistors.

17. The communication device of claim 14, wherein said compensation branches include inductors which form said parallel resonances in conjunction with capacitances of said non-conducting ones of said four switching elements.

* * * * *